US011914703B2

(12) United States Patent
Veshchikov et al.

(10) Patent No.: US 11,914,703 B2
(45) Date of Patent: Feb. 27, 2024

(54) METHOD AND DATA PROCESSING SYSTEM FOR DETECTING A MALICIOUS COMPONENT ON AN INTEGRATED CIRCUIT

(71) Applicant: NXP B.V., Eindhoven (NL)

(72) Inventors: Nikita Veshchikov, Brussels (BE); Ventzislav Nikov, Haasrode (BE)

(73) Assignee: NXP B.V., Eindhoven (NL)

( * ) Notice: Subject to any disclaimer, the term of this patent is extended or adjusted under 35 U.S.C. 154(b) by 839 days.

(21) Appl. No.: 16/502,668

(22) Filed: Jul. 3, 2019

(65) Prior Publication Data

US 2021/0004499 A1 Jan. 7, 2021

(51) Int. Cl.
*G06F 21/76* (2013.01)
*G06F 21/56* (2013.01)
(Continued)

(52) U.S. Cl.
CPC ...... *G06F 21/552* (2013.01); *G06F 18/24147* (2023.01); *G06F 21/554* (2013.01);
(Continued)

(58) Field of Classification Search
CPC ...... G06F 21/76; G06F 21/552; G06F 21/554; G06F 21/566; G06N 20/10; G06N 3/08; G06K 9/6276
See application file for complete search history.

(56) References Cited

U.S. PATENT DOCUMENTS 8,660,234 B2 * 2/2014 Bender ............... H03K 21/00
377/49
9,824,243 B2 * 11/2017 Chen ..................... G06F 21/85
(Continued)

FOREIGN PATENT DOCUMENTS

CN 104239616 A 12/2014
CN 104484525 A 4/2015
(Continued)

OTHER PUBLICATIONS

Beaumont, Mark et al.; "Hardware Trojans—Prevention, Detection, Countermeasures (A Literature Review)" Corporate Author: Defence Science And Technology Organisation Edinburgh, South Australia, Command Control Communications And Intelligence Div.; DSTO-TN-1012; AR No. 015-008; Jul. 2011.
(Continued)

*Primary Examiner* — Noura Zoubair
(74) *Attorney, Agent, or Firm* — Daniel D. Hill

(57) ABSTRACT

A method and data processing system are provided for detecting a malicious component in a data processing system. The malicious component may be of any type, such as a hardware trojan, malware, or ransomware. In the method, a plurality of counters is used to count events in the data processing system during operation, where each event has a counter associated therewith. A machine learning model is trained a normal pattern of behavior of the data processing system using the event counts. After training, an operation of the data processing system is monitored using the machine learning model. Current occurrences of events in the data processing system are compared to the normal pattern of behavior. If a different pattern of behavior is detected, an indication, such as a flag, of the different pattern of behavior is provided.

13 Claims, 2 Drawing Sheets

(51) Int. Cl.
  *G06N 20/10* (2019.01)
  *G06N 3/08* (2023.01)
  *G06K 9/62* (2022.01)
  *G06F 21/55* (2013.01)
  *G06F 18/2413* (2023.01)
(52) U.S. Cl.
  CPC ............ *G06F 21/566* (2013.01); *G06F 21/76* (2013.01); *G06N 3/08* (2013.01); *G06N 20/10* (2019.01)

(56) References Cited

U.S. PATENT DOCUMENTS

| | | | |
|---|---|---|---|
| 2013/0247194 A1* | 9/2013 | Jha | H04L 63/1425 726/23 |
| 2015/0369865 A1* | 12/2015 | Hershman | H03K 19/003 326/8 |
| 2016/0098561 A1* | 4/2016 | Keller | G06F 21/566 726/24 |
| 2016/0275289 A1* | 9/2016 | Sethumadhavan | H04L 63/0428 |
| 2019/0138423 A1* | 5/2019 | Agerstam | H04L 41/142 |
| 2020/0233964 A1* | 7/2020 | Hocker | G06F 21/64 |

FOREIGN PATENT DOCUMENTS

| | | |
|---|---|---|
| CN | 104615949 A | 5/2015 |
| CN | 104635144 A | 5/2015 |
| CN | 106815532 A | 6/2017 |
| CN | 102662144 B | 7/2017 |
| CN | 107480561 A | 12/2017 |
| CN | 108154051 A | 6/2018 |
| CN | 108387832 A | 8/2018 |
| CN | 108681669 A | 10/2018 |
| KR | 101835547 B1 | 3/2018 |

OTHER PUBLICATIONS

Das, Sanjeev, et al.; "SoK: The Challenges, Pitfalls, and Perils of Using Hardware Performance Counters for Security;" Proceedings of 40th IEEE Symposium on Security and Privacy; San Francisco, CA; May 20-22, 2019.

Denning, Dorothy et al.; "Requirements and Model for IDES—a Real-Time Intrusion-Detention Expert System: Final Report;" Issue 86, Part 1028 of Datalog file; Publisher: SRI International; Aug. 1985.

Hou, Yumin et al.; "R2D2: Runtime Reassurance and Detection of A2 Trojan;" 2018 IEEE International Symposium on Hardware Oriented Security and Trust (HOST); Washington, DC, Apr. 30-May 4, 2018; DOI: 10.1109/HST.2018.8383914.

Kim, Lok-Won et al.; "A Trojan-Resistant System-On-Chip Bus Architecture;" MILCOM 2009—2009 IEEE Military Communications Conf., Boston, MA; Oct. 18-21, 2009; DOI: 10.1109/MILCOM. 2009.5379966.

* cited by examiner

METHOD AND DATA PROCESSING SYSTEM FOR DETECTING A MALICIOUS COMPONENT ON AN INTEGRATED CIRCUIT

BACKGROUND

Field

This disclosure relates generally to data processing, and more particularly to a method and data processing system for detecting a malicious component on an integrated circuit.

Related Art

Some malicious components inserted into integrated circuits (IC) or on circuit boards by an IC fabrication plant are commonly referred as Hardware Trojans (HWT). Hardware Trojans can be used to collect information inside an IC and send it to a remote location. Hardware Trojans can also be used to damage or disable an IC as well as to give remote access to an unauthorized entity.

Many IC manufacturers use contract manufacturing to fabricate their circuit designs into IC devices. Because the IC manufacturer may not have control of an IC device when it is being fabricated, a HWT can be implemented as part of the IC design without the IC manufacturer knowing. Also, because of the complexity of many IC designs today, it may be difficult to detect the presence of a HWT. A HWT, or other type of malicious component such as malware or ransomware, may not be active when the IC device is first powered up, and to avoid detection during manufacturing, activation may be delayed. For example, an activation trigger may be a specific date or a particular instruction sequence. In addition, it is possible that not all IC devices from a particular source have a HWT embedded into them.

Therefore, a need exists for a reliable technique to detect a malicious component, such as a HWT in a data processing system during operation of the data processing system.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
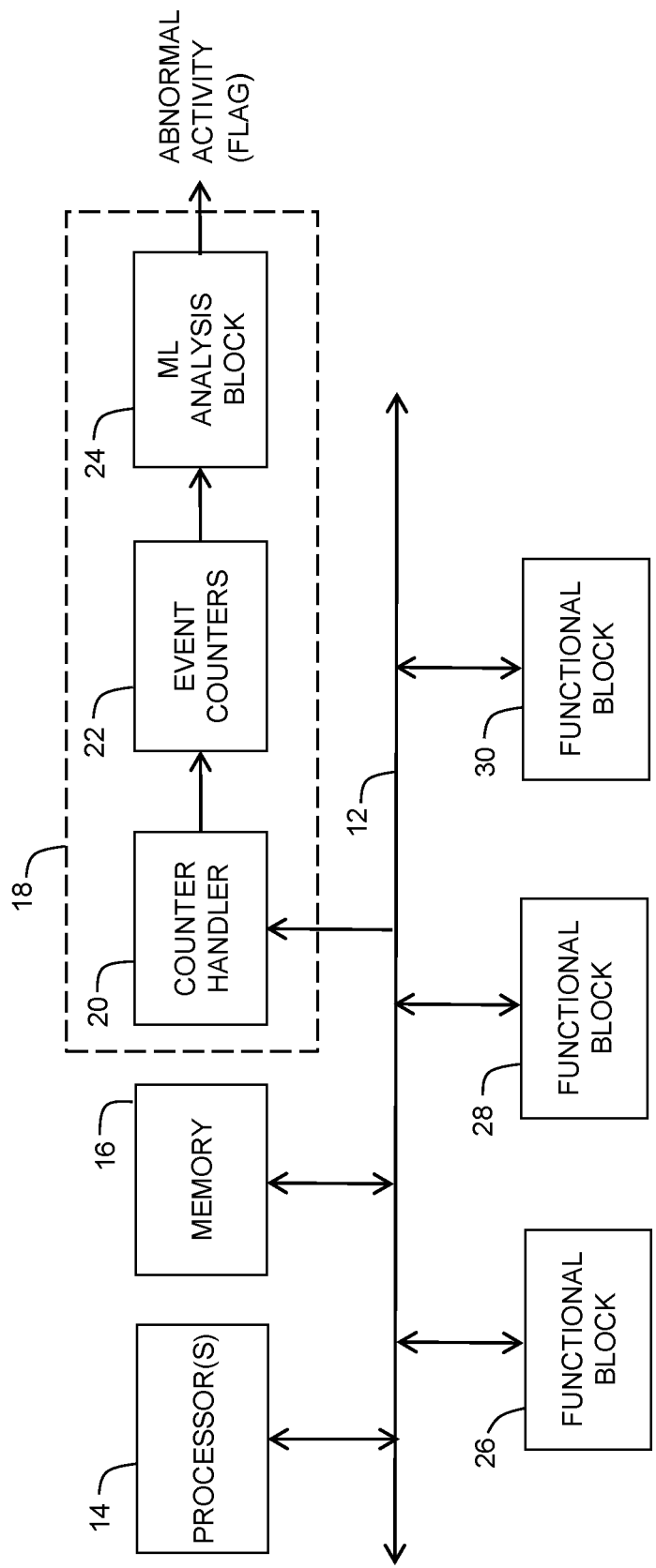
FIG. 1 illustrates a data processing system in accordance with an embodiment.

Generally, a data processing system and method are provided for detecting a malicious component in the data processing system. A detection circuit includes a plurality of event counters and a machine learning (ML) analysis block. Each event in the data processing system has an event counter associated with it. The ML analysis block receives the collected event counter information and a ML model uses the information to learn and record normal behavior of the data processing system. After the ML model is trained, the ML model then monitors the internal state of the data processing system during operation. If an abnormal pattern of activity is detected, the ML analysis block outputs an indication that a malicious component, such as a HWT may have been detected. Steps may then be taken to find and neutralize the malicious component.

The method is performed in near real-time, or on-the-fly, during operation of the data processing system to make it more likely that the malicious component will be detected soon after being triggered. Also, the ML model may be trained to be sensitive to small changes in behavior, so that a malicious component that has been designed to be difficult to detect is detected.

In accordance with an embodiment, there is provided, a data processing system including: a processor for executing instructions; a bus coupled to the processor; and a malicious component detection block coupled to the bus, the malicious circuit detection block comprising: a plurality of event counters for counting events in the data processing system; and a machine learning model coupled to the plurality of event counters, wherein a normal pattern of behavior of the data processing system is determined using the plurality of event counters, and wherein during operation of the data processing system an internal state of the data processing system is monitored, and in response to detecting a pattern of behavior that is different from the normal pattern of behavior, the malicious component detection block providing an indication. The machine learning model may include one of a support vector machine, a neural network, or a nearest neighbor algorithm. The data processing system may be characterized as being an integrated circuit system on a chip (SoC). The flag may be set in response to the different pattern of behavior being detected. An event counter of the plurality of event counters may be associated with every event that is monitored in the data processing system. The data processing system may further include a counter handler for controlling the plurality of event counters. The malicious component detection block may be implemented on a different integrated circuit than the data processing system.

In another embodiment, there is provided, a method for detecting a malicious component in a data processing system, the method including: counting an occurrence of events in the data processing system during operation of the data processing system; training a machine learning model a normal pattern of behavior of the data processing system from the event counts; monitoring operation of the data processing system using the machine learning model; detecting if a different pattern of behavior from the normal pattern of behavior occurs using the machine learning model; and providing an indication of the different pattern of behavior. Training of the machine learning model may further include training a machine learning model that includes one of a support vector machine, a neural network, a random forest, or a nearest neighbor algorithm. Training of the machine learning model may further include training the machine learning model on-the-fly during normal operation of the data processing system. The data processing system may be implemented on one or more integrated circuits. The machine learning model may be implemented on a different integrated circuit than the data processing system. Providing an indication of the different pattern of behavior may further include setting a flag in the data processing system. The machine learning model may compare current event occurrences to the normal pattern of behavior to determine if the different pattern of behavior indicates an activated malicious circuit.

In yet another embodiment, there is provided, a method for detecting a malicious component in a data processing system, the method includes: counting occurrences of a plurality of events in the data processing system during operation, each event of the plurality of events having a counter associated therewith; training a machine learning model a normal pattern of behavior of the data processing system using the event counts; monitoring operation of the data processing system using the machine learning model; comparing current occurring event occurrences of the data processing system to the normal pattern of behavior; if a different pattern of behavior is detected from the comparing, providing an indication of the different pattern of behavior. Training the machine learning model may further include training a machine learning model that includes one of a support vector machine, a neural network, a random forest, or a nearest neighbor algorithm. Training the machine learning model may further include training the machine learning model on-the-fly during normal operation of the data processing system. The data processing system may be implemented on one or more integrated circuits. The machine learning model may be implemented on a different integrated circuit than the data processing system. Providing an indication of the different pattern of behavior may further include setting a flag in the data processing system. The detected different pattern of behavior may indicate an activated malicious component.

FIG. 1 illustrates data processing system 10 in accordance with an embodiment. Data processing system 10 includes bus 12. Connected to bus 12 is one or more processors 14, memory 16, malicious component detection block 18, and functional blocks 26, 28, and 30. Malicious component detection block 18 includes counter handler 20, event counters 22, and ML analysis block 24. Machine learning analysis block 24 is trained to recognize a normal pattern of behavior of data processing system 10. Malicious component detection block 18 monitors event activity from subsystems 26, 28, and 30 as well as from processor 14. When an event is detected, counter handler 20 directs recording of the event to one of the plurality of counters 22. Machine learning analysis block 24 receives the counter information from counters 22. If a pattern of behavior is detected that is different from the learned normal pattern of behavior, then an indication labeled "ABNORMAL ACTIVITY" is provided. There are various ways the indication may be provided. One way to provide an indication of abnormal activity is to set a flag in a register (not shown) of processor 14.

Data processing system 10 may be implemented on one or more integrated circuits, and in one embodiment is characterized as being a System on a Chip (SoC). An SoC may include a number of subsystems such as functional blocks 26, 28, and 30. The functional blocks may be processors, various memory units (e.g., cache memory, RAM, ROM), hardware accelerators, access control units, etc. Processor 14 may be any hardware device capable of executing instructions stored in memory 16. Processor 14 may have multiple processing cores. Processor 14 may be, for example, a microprocessor, field programmable gate array (FPGA), application-specific integrated circuit (ASIC), or similar device. Processor 14 may be implemented in a secure hardware element and may be tamper resistant. Memory 16 is representative of both data memory and instruction memory and may include multiple separate memory blocks. Memory 16 may be any kind of data or instruction memory, such as for example, L1, L2, or L3 cache or system memory. Memory 16 may include volatile memory such as static random-access memory (SRAM) or dynamic RAM (DRAM), or may include non-volatile memory such as flash memory, read only memory (ROM), or other volatile or non-volatile memory. Also, memory 16 may be implemented in a secure hardware element. Alternately, memory 16 may include a hard drive implemented externally to data processing system 10. Memory 16 may include one or more machine-readable storage media for storing instructions for execution by processor 14.

An event may be any computation or information transfer in data processing system 10. Instruction execution may initiate events. The transfer of data from random-access memory (RAM) into cache memory may be one such event. Another example of an event may be an interrupt or an incorrect prediction by a branch-predictor (not shown). Each of the events to be monitored is associated with an event counter from plurality of event counters 22. The counters should be set to zero at startup or on reset of data processing system 10. When an event is detected, a counter associated with the event is incremented. The counter is incremented every time the specific associated event occurs in data processing system 10. To increment a counter, every block that generates the event related to that counter will provide a signal on bus 12 that is detected by malicious circuit detection block 18. The signal may be a unique event identifier that is written to bus 12. In one embodiment, bus 12 is a special bus that is read by counter handler 20 and connected to event counters 22. Note, that one or more of event counters 22 can overflow, i.e., the count value may reach a maximum possible value for the number of allotted bits. If another command to increment is received, the counter will overflow. It is common for the count value to return to zero in response to an overflow, which will cause an inaccurate count value from that counter. This issue may be dealt with in several ways. For example, the counter count value can be returned to zero every time the count value is read. The reading frequency of the counter should be high enough to ensure that the counter does not overflow in an allotted period of time. In another technique, a counter overflow can be detected by checking if a new counter value is smaller than a previous counter value.

The type of event, as well as the order in which the events are generated, may depend on the kind of applications that are executed on data processing system 10. In one embodiment, malicious component detection block 18 is implemented as a special hardware circuit in addition to the normal components of data processing system 10 as illustrated in FIG. 1. In another embodiment, malicious component detection block 18 may be implemented in software. Also, the special hardware or software may be implemented on a separate processor that is not accessible to normal users and programmers and may be implemented on a different IC. Malicious component detection block 18 includes ML analysis block 24. Machine learning analysis block 24 includes a ML model that is trained using the stored counter output values to deduce the normal behavior and normal state of data processing system 10. The ML model is a conventional ML model that may be implemented in various ways, such as for example, using a Support Vector Machine, a Neural Networks, a Nearest Neighbor (NNr) algorithm, or a random forest. Other implementations are possible. The ML model may be trained on-the-fly in the field, or the ML model may be trained during manufacturing. After ML analysis block 24 is trained to know the normal behavior pattern of data processing system 10, ML analysis block 24 is used to monitor the internal state of data processing system 10 for abnormal behavior during normal operation of data processing system 10. If an abnormal pattern of activity is detected, ML analysis block 24 will provide an indication of the abnormal activity, such as setting a flag, that is visible to other part of a system such as an Operating System (OS), to system firmware, or by sending a message to a server or other entity external to data processing system 10.

It may be difficult to determine the cause of the indication of abnormal activity because the abnormal activity may have one of several causes. For example, software such as malware may have altered the normal function of the operating system or an application running in data processing system 10. Also, a hardware or software malfunction may have occurred. In addition, a HWT may have been triggered.

In one embodiment, special software or firmware is provided in malicious component detection block 18 to determine the cause of the abnormal activity indication. For example, a hardware malfunction may be identified by determining that the device or a function of the device is permanently broken. However, if it can be determined that many devices generate similar alerts of abnormal pattern activity and report the abnormal activity to a central server, then there is a chance that a HWT was embedded into data processing system 10 during manufacturing.

Generally, a process for detecting the cause of the abnormal activity may first eliminate a possibility that the abnormal activity is caused by a hardware error. Then, the process may determine that the abnormal activity is not caused by a software error. If the abnormal activity is not either a hardware malfunction or a software problem, the abnormal activity may be caused by a HWT.

If malicious software caused the problem, then other similar devices may have similar behavior that can be detectable on the cloud level. If a hardware error or malfunction caused the problem, then the problem will remain after a software update. After a software update the abnormal behavior will still be there, but that may also be true if the problem is caused by a HWT. If the problem is detected on more than one device, then the possibility of a hardware error is reduced.

Figure 2:
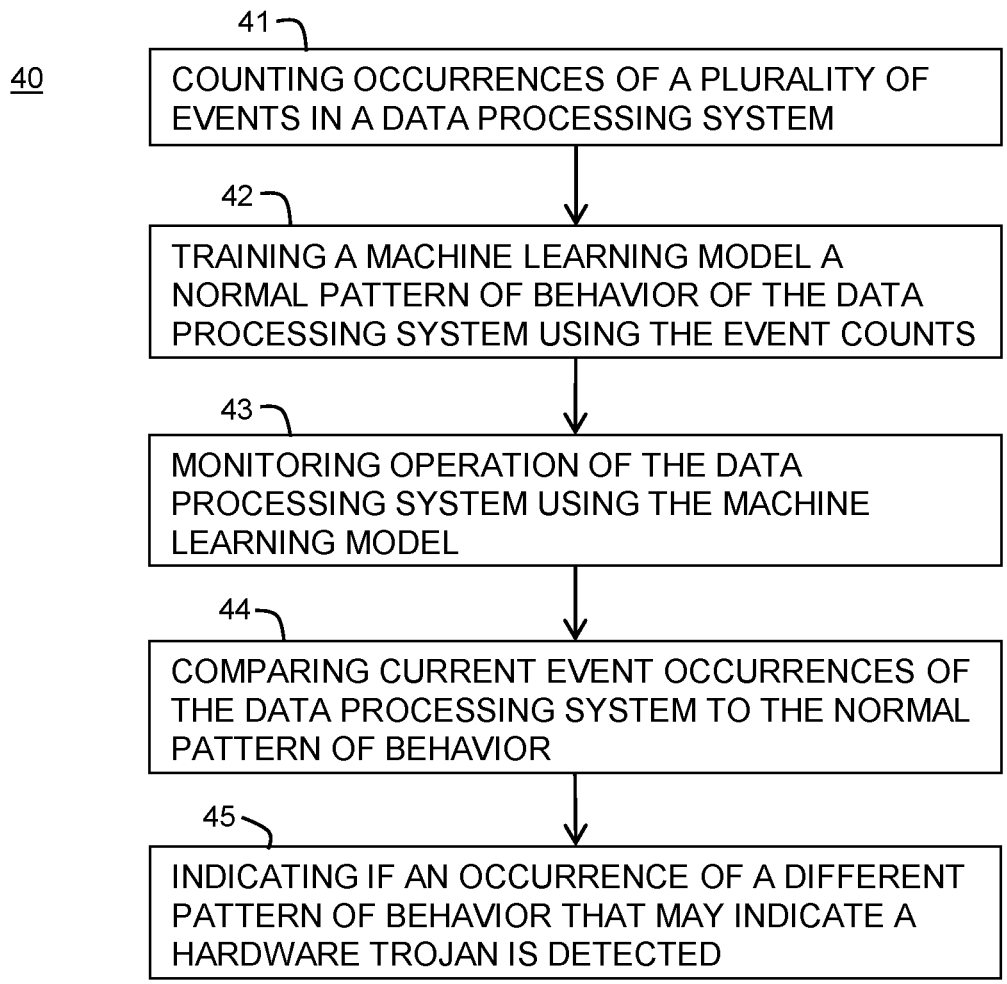
FIG. 2 illustrates a method for detecting a malicious component in a data processing system in accordance with an embodiment.

FIG. 2 illustrates method 40 for detecting a malicious component of a data processing system in accordance with an embodiment. Method 40 begins at step 41. At step 41, occurrences of a plurality of events in data processing system 10 are counted using plurality of event counters 22. At step 42, a ML model, such as an ML analysis block 24 is trained to recognize a normal pattern of behavior of data processing system 10 using event counts from plurality of event counters 22. At step 43, operation of data processing system 10 is monitored using the ML model. At step 44, currently occurring events of data processing system 10 are compared with the normal pattern of behavior that was learned during training of the ML model. At step 45, if a different pattern of behavior is detected, ML analysis block 24 outputs an indication. Further action may be taken in response to receiving the indication.

Method 40 is performed in near real-time during operation of data processing system 10 to make it more likely that a malicious component, such as a HWT, will be detected soon after the malicious component is triggered. Also, the ML model may be trained to be sensitive to small changes in behavior, so that a HWT designed to be very non-intrusive to normal operations is detected.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for detecting a malicious hardware circuit in a data processing system, the data processing system including a processor and a memory, the method comprising:
    counting an occurrence of events in the data processing system during operation of the data processing system;
    training a machine learning model a normal pattern of behavior of the data processing system from the event counts;
    monitoring an internal state of the data processing system during operation of the data processing system using the machine learning model;
    detecting, based on the monitoring, if a different pattern of behavior from the normal pattern of behavior occurs using the machine learning model;
    providing an indication of the different pattern of behavior;
    in response to determining that the different pattern of behavior remains after a software update in the data processing system, indicating the different pattern of behavior is caused by a hardware malfunction;
    detecting the hardware malfunction in more than one data processing system; and
    in response to determining that the hardware malfunction is found in more than one data processing system, indicating an activated malicious hardware circuit is implemented in the more than one data processing system.

2. The method of claim 1, wherein training the machine learning model further comprises training a machine learning model that includes one of a support vector machine, a neural network, a random forest, or a nearest neighbor algorithm.

3. The method of claim 1, wherein training the machine learning model further comprises training the machine learning model in real-time during operation of the data processing system.

4. The method of claim 1, wherein the data processing system is implemented on one or more integrated circuits.

5. The method of claim 1, wherein providing an indication of the different pattern of behavior further comprises setting a flag in the data processing system.

6. The method of claim 1, wherein the machine learning model compares current event occurrences to the normal pattern of behavior to determine if the different pattern of behavior indicates an activated malicious circuit.

7. A method for detecting a malicious hardware circuit in a data processing system, the data processing system including a processor and a memory, the method comprising:
- counting occurrences of a plurality of events using an event counter in the data processing system during operation, each event of the plurality of events having a counter associated therewith;
- training a machine learning model a normal pattern of behavior of the data processing system using the event counts;
- monitoring an internal state of the data processing system during operation of the data processing system using the machine learning model;
- comparing, based on the monitoring, currently occurring event occurrences of the data processing system to the normal pattern of behavior;
- if a different pattern of behavior is detected from the comparing, providing an indication of the different pattern of behavior;
- in response to determining that the different pattern of behavior remains after a software update in the data processing system, indicating the different pattern of behavior is caused by a hardware malfunction;
- detecting the hardware malfunction in more than one data processing system; and
- in response to determining that the hardware malfunction is found in more than one data processing system, indicating an activated malicious hardware circuit is implemented in the more than one data processing system.

8. The method of claim 7, wherein training the machine learning model further comprises training a machine learning model that includes one of a support vector machine, a neural network, a random forest, or a nearest neighbor algorithm.

9. The method of claim 7, wherein training the machine learning model further comprises training the machine learning model in real-time during operation of the data processing system.

10. The method of claim 7, wherein the data processing system is implemented on one or more integrated circuits.

11. The method of claim 10, wherein the method is performed using a malicious circuit detection module, and wherein the malicious circuit detection module is implemented on a different integrated circuit than the data processing system.

12. The method of claim 7, wherein providing an indication of the different pattern of behavior further comprises setting a flag in the data processing system.

13. The method of claim 7, further comprising returning the event counter to zero every time the event counter is read to protect the event counter from overflowing.

\* \* \* \* \*